(12) United States Patent
Dreixler et al.

(10) Patent No.: US 9,816,585 B1
(45) Date of Patent: Nov. 14, 2017

(54) REPAIR LINK FOR TWIST LINK AND OTHER CHAIN TYPES

(71) Applicant: Columbia Steel Casting Co., Inc., Portland, OR (US)

(72) Inventors: Charles Dreixler, Canby, OR (US); Jesse Fritz, Fairview, OR (US)

(73) Assignee: Columbia Steel Casting Co., Inc., Portland, OR (US)

( * ) Notice: Subject to any disclaimer, the term of this patent is extended or adjusted under 35 U.S.C. 154(b) by 0 days.

(21) Appl. No.: 15/468,000

(22) Filed: Mar. 23, 2017

(51) Int. Cl.
*F16G 15/04* (2006.01)
*F16G 15/06* (2006.01)

(52) U.S. Cl.
CPC ............. *F16G 15/06* (2013.01); *F16G 15/04* (2013.01)

(58) Field of Classification Search
CPC .................................. F16G 15/06; F16G 15/04
USPC .............................................................. 59/86
See application file for complete search history.

(56) References Cited

U.S. PATENT DOCUMENTS

| | | | |
|---|---|---|---|
| 685,554 A | 10/1901 | Asbill | |
| 1,280,906 A | 10/1918 | Vogt | |
| 1,347,725 A | 7/1920 | Weiss | |
| 1,380,903 A * | 6/1921 | Haughwout | F16G 15/00 294/82.17 |
| 1,409,928 A | 3/1922 | Clark | |
| 1,567,426 A * | 12/1925 | Donovan | B60C 27/08 152/243 |
| 1,769,876 A * | 7/1930 | Duncan | B60C 27/08 59/84 |
| 1,979,069 A | 10/1934 | Hancock | |
| 2,004,677 A | 6/1935 | Stowe | |
| 2,068,222 A | 1/1937 | Bambenek et al. | |
| 2,079,384 A | 5/1937 | Page | |
| 2,116,875 A | 5/1938 | Barnes | |
| 2,129,354 A | 9/1938 | Harris | |
| 2,168,539 A | 8/1939 | Reynolds | |
| 2,177,753 A | 10/1939 | St Pierre | |
| 2,216,831 A | 10/1940 | Robbins | |

(Continued)

FOREIGN PATENT DOCUMENTS

GB    991218    5/1965

OTHER PUBLICATIONS

ESCO, "ESCO Kwik-Wedge™ Repair Links," P5032MIN01L0709 (2009).

(Continued)

*Primary Examiner* — David B Jones
(74) *Attorney, Agent, or Firm* — Klarquist Sparkman, LLP

(57) ABSTRACT

A repair link for chain comprises a body and first and second loop sections. The body has a longitudinal axis. The first loop section extends from the body and defines a first loop opening with a first loop axis extending normal to the first loop opening. The second loop section extends from the body opposite the first loop section. The second loop section defines a second loop opening with a second loop axis extending normal to second loop opening. The first loop axis and the second loop axis are non-parallel. Each of the first and second loop sections has a removable loop segment. Each removable loop segment is removable to open the respective loop opening to couple the repair link to another link of chain, and reassembleable with the respective loop section in a locked position to secure the removable loop segment and enclose the respective loop opening.

21 Claims, 9 Drawing Sheets

(56) References Cited

U.S. PATENT DOCUMENTS

| | | | |
|---|---|---|---|
| 2,262,653 A | | 11/1941 | Robbins |
| 2,374,392 A | | 4/1945 | St. Pierre |
| 2,621,471 A | | 12/1952 | Dock |
| 2,761,275 A | | 9/1956 | Robbins |
| 2,777,284 A | | 1/1957 | Page |
| 3,104,519 A | | 9/1963 | Kelting, Jr. |
| 3,237,396 A | * | 3/1966 | Brugnola .............. F16C 1/04 59/85 |
| 3,243,952 A | | 4/1966 | Page |
| 3,906,716 A | * | 9/1975 | Dock .............. F16G 15/04 59/85 |
| 3,941,175 A | | 3/1976 | Muller |
| 4,060,978 A | | 12/1977 | McBain et al. |
| 4,635,438 A | | 1/1987 | Rottinghaus |
| 5,131,723 A | * | 7/1992 | Roling .............. F16G 13/14 299/43 |
| 5,133,179 A | | 7/1992 | Bernt et al. |
| 6,871,486 B2 | | 3/2005 | Moehnke et al. |
| 8,756,907 B2 | | 6/2014 | Briscoe et al. |
| 8,789,248 B2 | * | 7/2014 | McKay .............. B66C 1/125 24/370 |
| 9,163,378 B2 | | 10/2015 | Doan et al. |

OTHER PUBLICATIONS

ESCO, "ESCO ProLink™ Mechanical Dragline Repair Link," P5127MIN01L1215.

ESCO, "ProLink™ Mechanical Dragline Chain Link," P6049MIN01A1115 (2015).

* cited by examiner

REPAIR LINK FOR TWIST LINK AND OTHER CHAIN TYPES

BACKGROUND

A repair link for chain is useful to replace one or more damaged links of a segment of chain to allow it to be returned to service. Such a repair link can also be used in some applications as a coupling link to couple a segment of regular chain to another object.

Some repair links are designed to be of a single-use type that can only be closed to connect to one or more adjacent links a single time. Other repair links can be opened and closed multiple times as desired.

For heavy chain such as is used in industrial and mining applications, it would be desirable to provide a repair link that has robust strength, sufficient useful life under harsh wear applications, wide mobility to not limit movement of the chain, compatibility with current chain designs and easy to use features for making connections to adjacent chain links or other objects. In addition, it would be desirable to provide a repair link suited for use with twist link chain (i.e., where the opposing eyes of each chain link are twisted or rotated relative to each other).

SUMMARY

Described below are implementations of a repair link for chain that addresses some of the shortcomings of conventional repair and coupling links.

According to one implementation, a repair link for chain comprises a body and first and second loop sections. The body has a longitudinal axis. The first loop section extends from the body and defines a first loop opening with a first loop axis extending normal to the first loop opening. The second loop section extends from the body opposite the first loop section. The second loop section defines a second loop opening with a second loop axis extending normal to second loop opening. The first loop axis and the second loop axis are non-parallel. Each of the first and second loop sections has a removable loop segment. Each removable loop segment is removable to open the respective loop opening to couple the repair link to another link of chain, and reassembleable with the respective loop section in a locked position to secure the removable loop segment and enclose the respective loop opening.

In some implementations, the first loop section and the second loop section are rotated relative to each other such that the first loop axis and the second loop axis are rotated approximately 90 degrees relative to each other.

In some implementations, the removable loop segment is removable from the respective loop section by sliding the removable loop segment in a direction generally parallel to the longitudinal axis and urging the removable loop segment in a transverse direction generally perpendicular to the longitudinal axis.

In some implementations, the repair link comprises a lock member actuatable to lock the removable loop segment in the locked position relative to the respective loop section. The lock member can comprise a shaft with a protruding nub at a distal end, and the respective loop section can comprise a through hole shaped to receive the shaft and a groove shaped to receive the nub. The repair link can comprise a compression washer with an opening shaped to receive the shaft, the compression washer being configured to provide a biasing force tending to retain the rotatable lock member in the locked position. The groove can comprise a detent positioned at a selected angle of rotation relative to an insertion direction and shaped to retain the nub.

In some implementations, the removable loop segment has a distal end and an opposite proximal end, and wherein the proximal end has a forked configuration defining two spaced apart interior hooks. The removable loop segment can comprise a loop segment body having an exterior surface subject to wear during use, the exterior surface comprising wear indicator regions covering each of the interior hooks. The repair link can comprise a pair of spaced apart recesses shaped to receive the forked configuration of the inner end of the removable loop segment.

In some implementations, the distal end comprises an extension, and the body comprises a cavity shaped to receive the extension. The cavity can be dimensioned larger than the extension in the longitudinal direction, and wherein the removable loop segment can be moved in the axial direction relative to the body with the extension translating within the cavity.

The distal end can comprise an extension and a lip protruding from the extension, and the body can comprise a cavity shaped to receive the extension. The cavity can further comprise a recess shaped to receive the lip. The cavity can extend from an inner surface, and the body can comprise a through hole for a locking pin that extends from an opposite outer surface and is joined to the cavity. A locking pin shaped to be received in the through hole can be positioned to extend into the cavity to contact the extension of the removable loop segment and to resist axial movement thereof.

The removable loop segment can be a first removable lock segment, and there can be a second removable lock segment. The first and second removable lock segments can be movable independent of the other.

In some implementations, the repair link has a double pitch configuration. In some implementations, the repair link is configured to replace one link of twist link chain.

In some implementations, the body, the first loop section, the second loop section and the removable loop segments are formed by casting. In some implementations, the removable loop segment is configured for assembly with the body without machining.

The foregoing features and advantages of the invention will become more apparent from the following detailed description, which proceeds with reference to the accompanying figures.

DETAILED DESCRIPTION

Described below are implementations of a repair link suited for repairing broken or damaged links of chain, and particularly heavy duty chain, such as chain used in draglines and other similar applications. In addition to serving as a replacement link for one or more damaged links of chain, the repair link can also be used to as coupling link to couple a link of chain or other object to another link of chain or other object.

The repair link is suited for use with twist link chain. A link of "twist link" chain as used herein is defined to have ends, or eyes, that are rotated relative to each other. One example of twist link chain is Columbia Steel TwistLink® chain for draglines. The Columbia Steel TwistLink® chain is double pitch chain, and thus the repair link described herein can be used with double pitch chain.

Figures 1, 2:
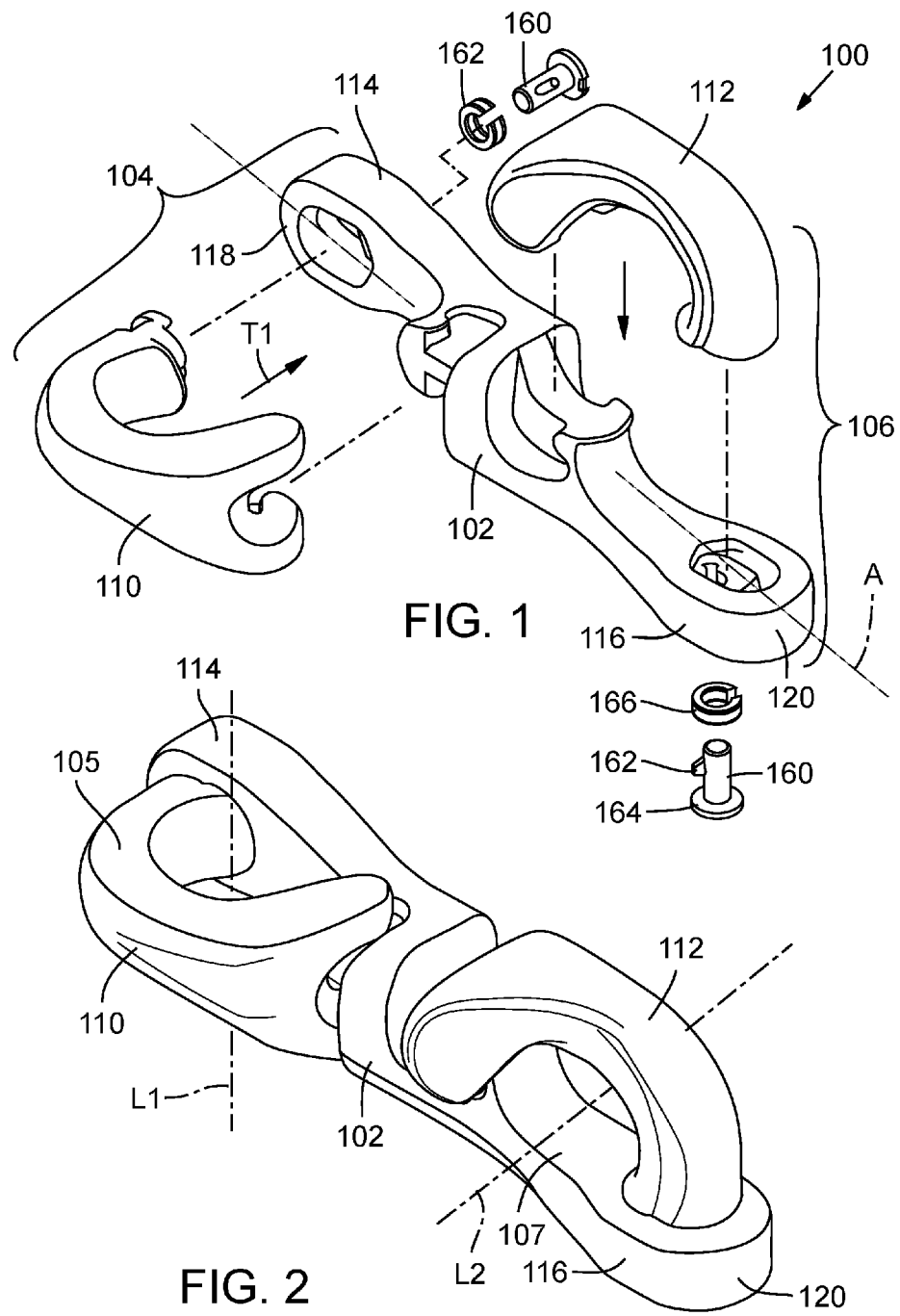
FIG. 1 is an exploded perspective view of an implementation of the repair link.
FIG. 2 is a perspective view of the repair link of FIG. 1 in an assembled state.

Referring first to FIGS. 1 and 2, a repair link 100 according to one implementation has a body 102, a first loop section 104 at one end and a second loop section 106 at a second end generally opposite the first end along a longitudinal axis A. As described, the first loop section 104 and the second loop section 106 are rotated relative to each other: each extends in a distinct plane, and the two planes are intersecting.

As best shown in FIG. 2, the first loop section 104 defines a first loop opening 105 with an axis L1 extending normal to the opening 105. Similarly, the second loop section 106 defines a second loop opening 107 with an axis L2. The axes L1, L2 are not parallel to each other, and the angle between them can be a measure by which the loop sections 104, 106 are rotated relative to each other. In the illustrated implementations, the loop sections 104, 106 are rotated by approximately 90 degrees relative to each other, but other rotations are also possible. For example, in other embodiments, the loop sections may be rotated relative to each other by 45 degrees, or by a different angle in the range 20 to 90 degrees.

Referring again to FIG. 1, the first loop section 104 has a removable loop segment 110, and the second loop section 106 has a removable loop segment 112. Optionally, the removable loop segments 110, 112 can be identical, such as is shown in FIGS. 1 and 2, but it is also possible for the removable loop segments 110, 112 to be configured differently from each other. The removable loop segments 110, 112 allow the respective loop sections 104, 106 to be opened for coupling the repair link 100 to another link or object.

Figure 3:
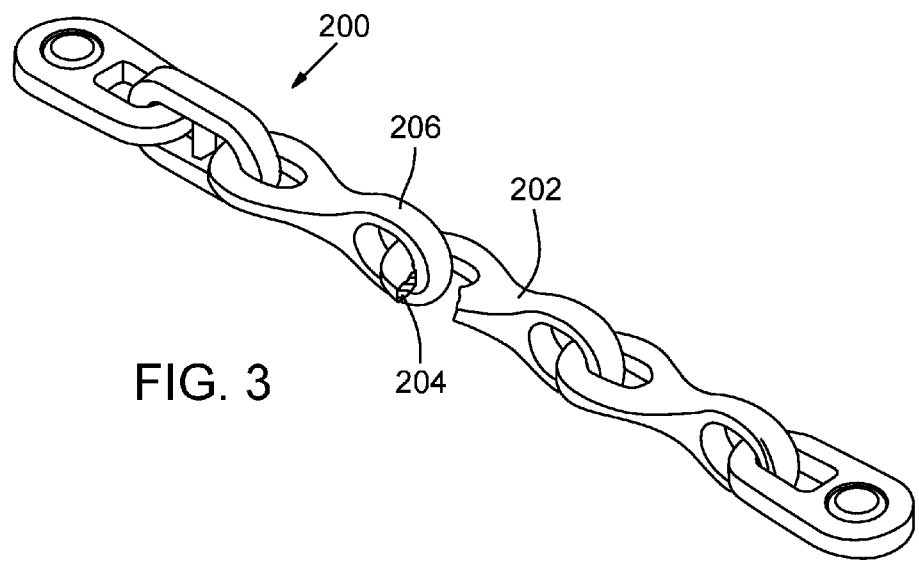
FIG. 3 is a perspective view of a section of chain showing a link with a broken eye section that requires replacement.
Figure 4:
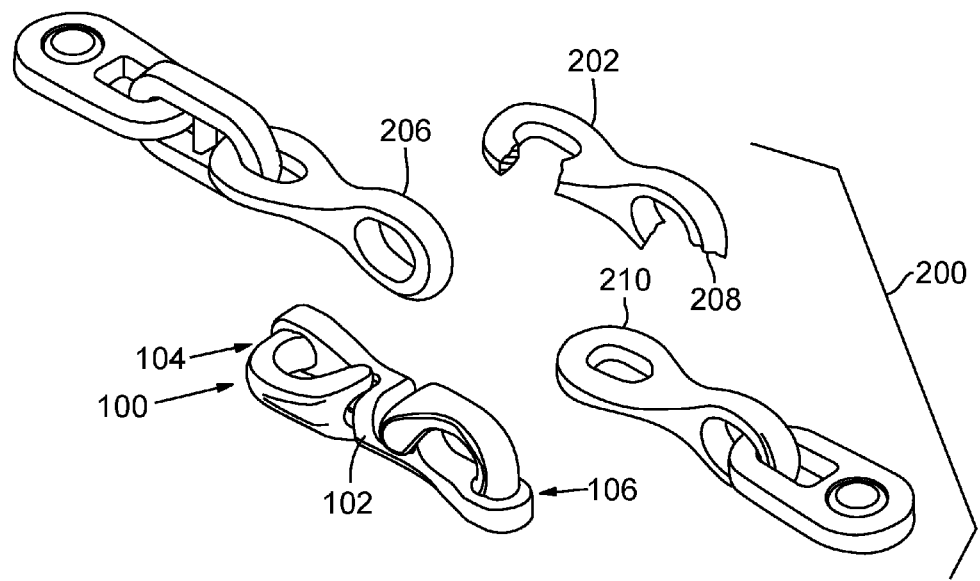
FIG. 4 is a perspective view of the section of chain of FIG. 3 showing the repair link being positioned relative to the section of the chain to replace the link with the broken eye section.

In FIG. 3, a segment of conventional dragline chain 200 is shown. A link 202 has a worn or broken first eye section 204 and thus requires replacement. In FIG. 4, the link 202 has been removed from the chain segment 200 by withdrawing the first eye section 204 away from an adjacent link 206. A second eye section 208 has been opened, such as by using a cutting torch or air carbon arc cutter, to allow it to be withdrawn from adjacent link 210. As also shown in FIG. 4, the repair link 100 has been positioned next to the chain segment 200. The first loop section 104 can be opened for coupling with the link 206, and the second loop section 106 can be opened for coupling with the link 210, thus allowing the repair link 100 to be substituted for the link 202 and repairing the chain segment 200.

Figure 5:
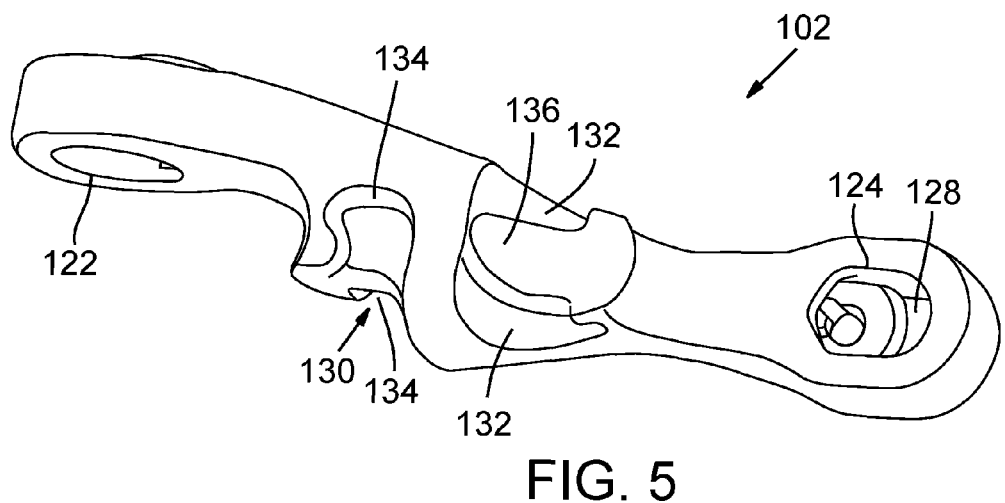
FIG. 5 is a perspective view of a body of the repair link of FIG. 1 with the removable loop sections removed.
Figure 6:
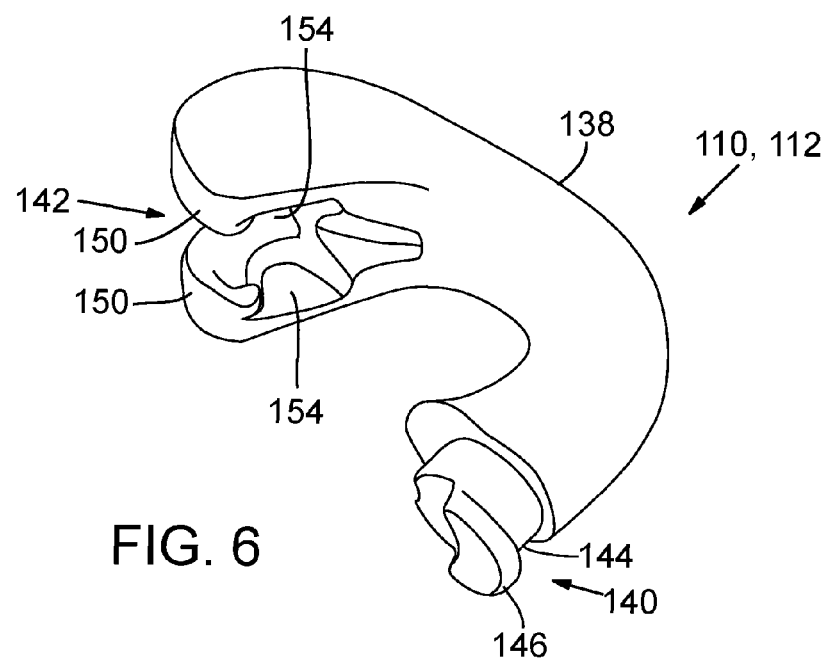
FIG. 6 is a perspective view of one of the removable loop sections.

FIG. 5 is a perspective view of the body 102 with the removable loop segments 110, 112 removed. FIG. 6 is a perspective of one of the removable loop segments 110, 112. Each removable loop segment 110, 112 has a body 138, a distal end 140 and a proximal end 142. The distal end 140 is shaped to engage with the body 102. In the illustrated implementation, the distal end has an extension 144 shaped to be received in a cavity 122, 124 in the body 102. The distal end 140 can have a lock lip 146 shaped to extend into a recess 126, 128 to lock the removable loop segment 110, 112 in the cavity 122, 124, as is described in further detail below.

The proximal end 142 can bifurcated or forked as shown, and formed with a pair of hooks 150 that are spaced apart from each other. The hooks 150 can include respective recessed areas 154, such as are shown in FIG. 6. The hooks 150 and recessed areas 154 can be shaped for engagement with corresponding hook receiving areas 130, 132 formed in the body 102 and separated from each other by a web 134, 136.

Figure 7:
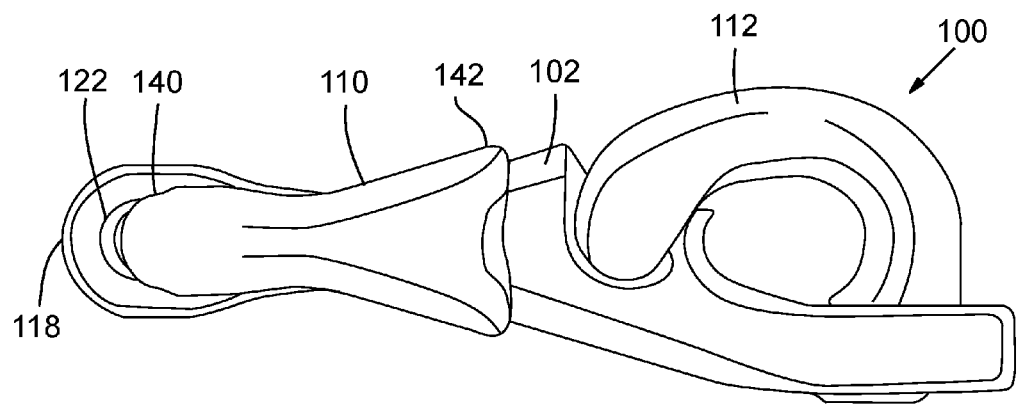
FIGS. 7 and 8 are elevation views of the repair link showing one of the loop sections (at the left) in inserted but unlocked and locked positions, respectively, with the loop section at the right being shown in the assembled position.
Figure 8:
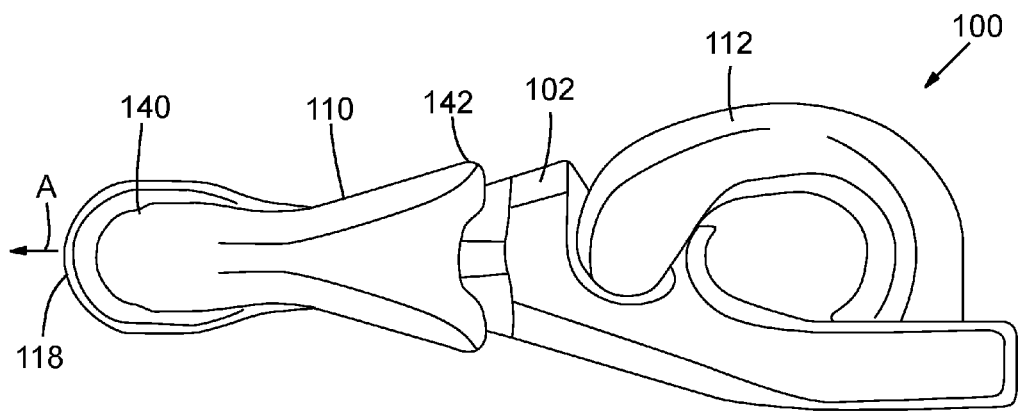
Figure 9:
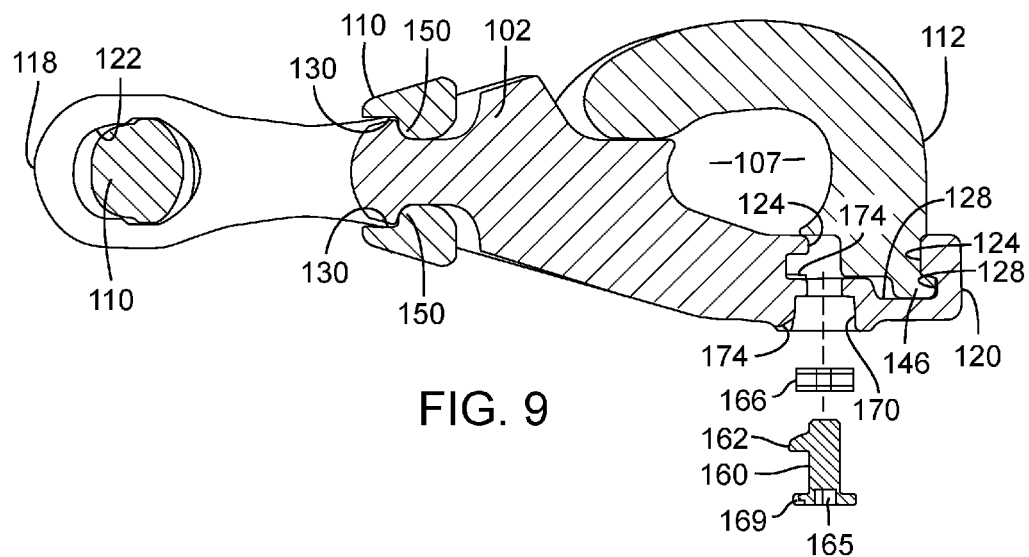
FIGS. 9 and 10 are sectioned views in elevation of the repair link of FIG. 8 showing details of the loop section at the right before and after a locking member is installed.

Referring to FIGS. 1, 5 and 6, the removable loop segment 110 is assembled with the body 102 by aligning the removable loop segment 110 as shown in FIG. 1 and then moving it transversely in the direction T1 until the hooks 150 of the proximal end 142 are received in the hook receiving areas 130 and extension 144 of the distal end 140 is received in the cavity 122. FIG. 7 is a side elevation view of the repair link 100 showing the removable loop segment 110 after has been aligned and inserted. As shown in FIG. 8, the removable loop segment 110 is then moved in the axial direction A toward the end 118, i.e., away, to cause the lock lip 146 to engage to occupy the recess 146 (see, e.g., FIGS. 9 and 10), which is referred to as the assembled position. The same procedure was followed to assemble the removable loop segment 112 with the body 102.

When either of the removable loop segments 110, 112 is in the assembled position, it can be further secured to the body 102. In some implementations, each removable loop segment 110, 112 is secured to the body 102 with a separate locking member 160, as shown, e.g., in FIGS. 1, 9 and 10. In the illustrated implementations, the locking member 160 is positioned to extend transversely and approximately perpendicular to the longitudinal axis A.

Figure 10:
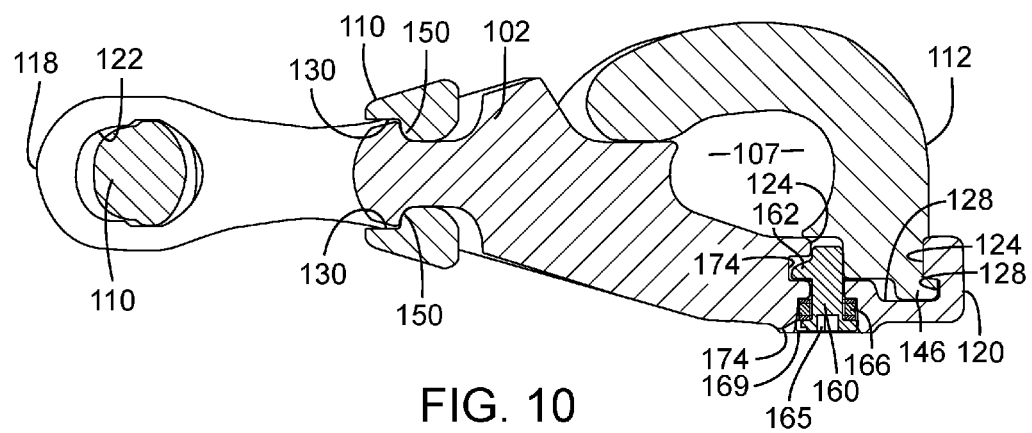
Figure 11:
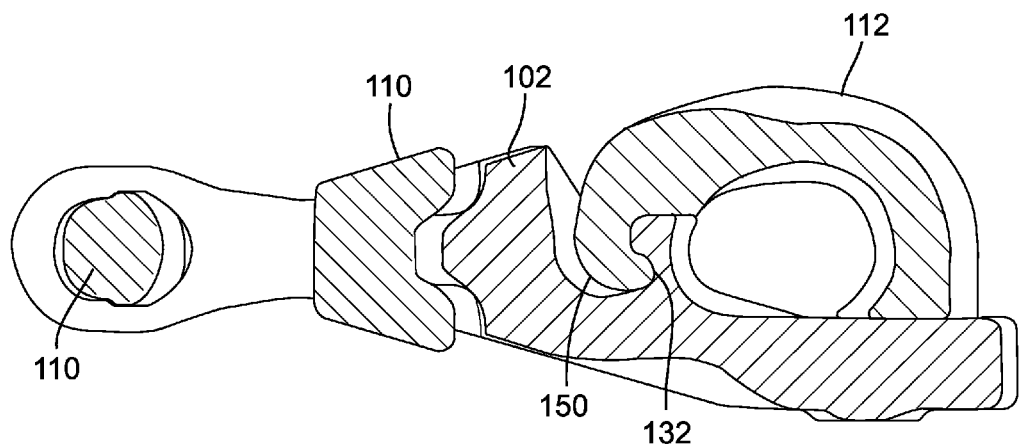
FIG. 11 is another sectioned view in elevation taken at a different point to illustrate the engagement between the hook of the removable loop segment and the body of the repair link.
Figure 12:
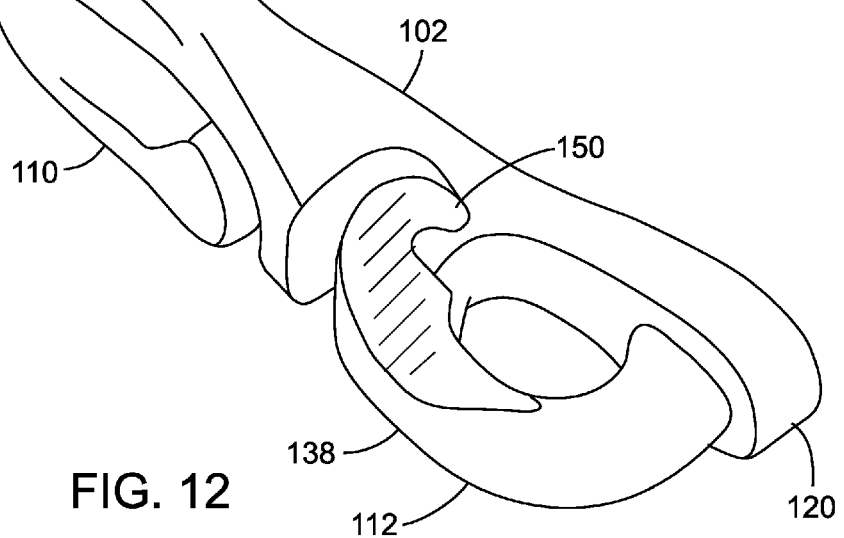
FIG. 12 is a perspective view of the repair link showing wear after use.

The locking member 160 can be inserted into a bore 170 in the body 102 and rotated to lock the respective removable loop segment 110, 112 in its assembled position. In the assembled position, as best shown in FIG. 10, the end of the lock pin 160 contacts the extension 144 of the removable locking member 160 and resists movement of the removable locking member 112 axially toward the opposite end 118. In addition, because axial movement is resisted, the lock lip 146 remains engaged in the recess 128. The engagement of the lock lip 146 with the recess 128 at the distal end 140, together with engagement of the hooks 150 and the recessed areas 132 (see FIG. 11), resists movement in the transverse direction.

In the illustrated implementations, the locking member 160 has a radially extending nib 162 and the body 102 has a groove 174, such as a helical groove, within which the nib 162 can be moved by rotating the locking member 160. The bore 170 can have a counterbore 172 of a larger dimension to accommodate a head 164 of the locking member and a compression washer 166.

Figure 14:
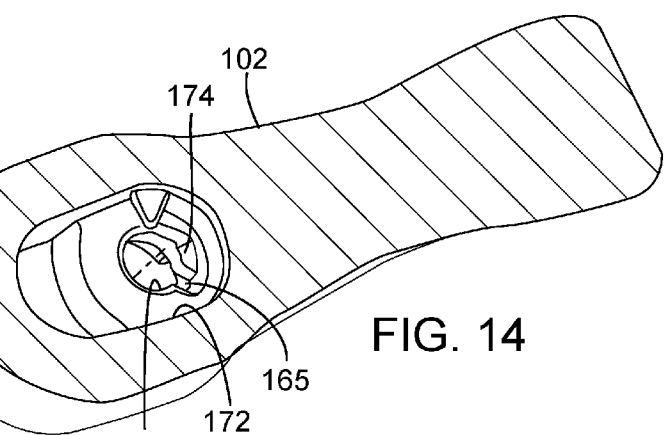
FIG. 14 is an exploded perspective view showing the locking member positioned for assembly with the repair link, a portion of which is shown sectioned to show the shape of the cavity.
Figure 13:
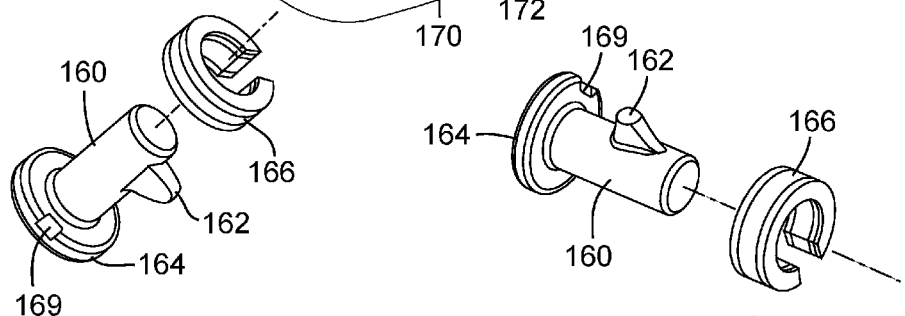
FIG. 13 is an exploded perspective view of the locking; member and a compression washer.
Figure 15:
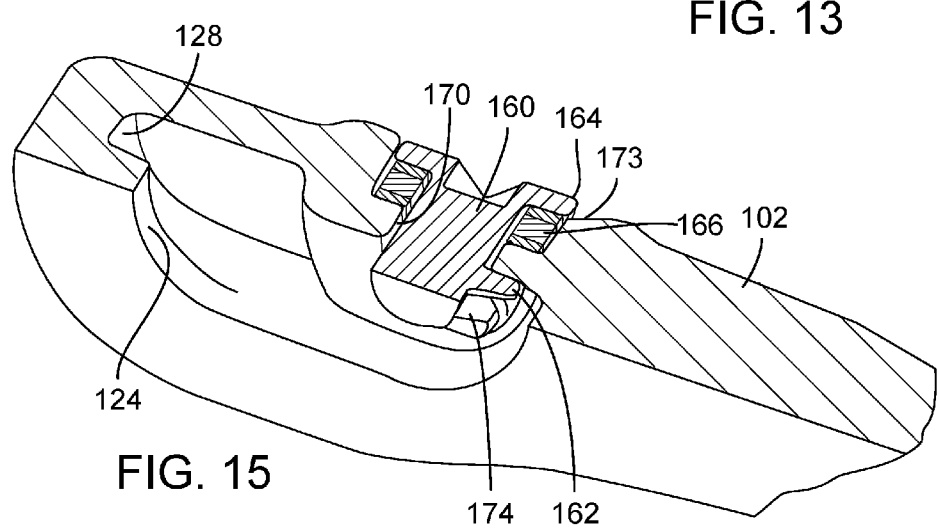
FIG. 15 is another perspective view showing a sectioned portion of the repair link and the assembled locking member and compression washer.
Figure 16:
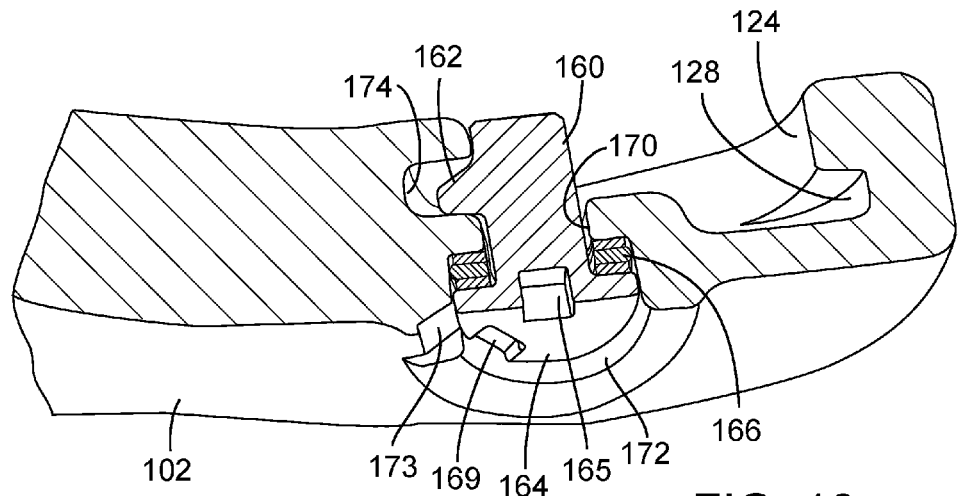
FIGS. 16 and 17 are perspective views similar to FIG. 15, except showing sectioned portions of the repair link and locking member from different perspectives.

FIG. 13 is an exploded perspective view of the locking member 160 and the compression washer 166. FIGS. 14-17 are various section views of a portion of the body 102 shown from different angles to illustrate how the locking member 160 cooperates with the body 102. In FIG. 14, prior to insertion, the locking member is aligned with the bore 170 with the nib 162 aligned with a keyhole 165. In FIG. 15, the locking member 160 has been inserted, and the nib 162 is aligned with the groove 174 of the body 102. The head 164 and the compression washer 166 are at least partially accommodated in the counterbore 172. As the locking member 160 is rotated, such as in the clockwise direction, the nib 162 engages the groove 174 and urges the locking member 160 transversely inward, as illustrated in FIG. 16. The transverse movement of the locking member 160 compresses the compression washer 166, which causes it to exert a resisting force tending to keep the nib 162 engaged with the groove 174.

Figure 17:
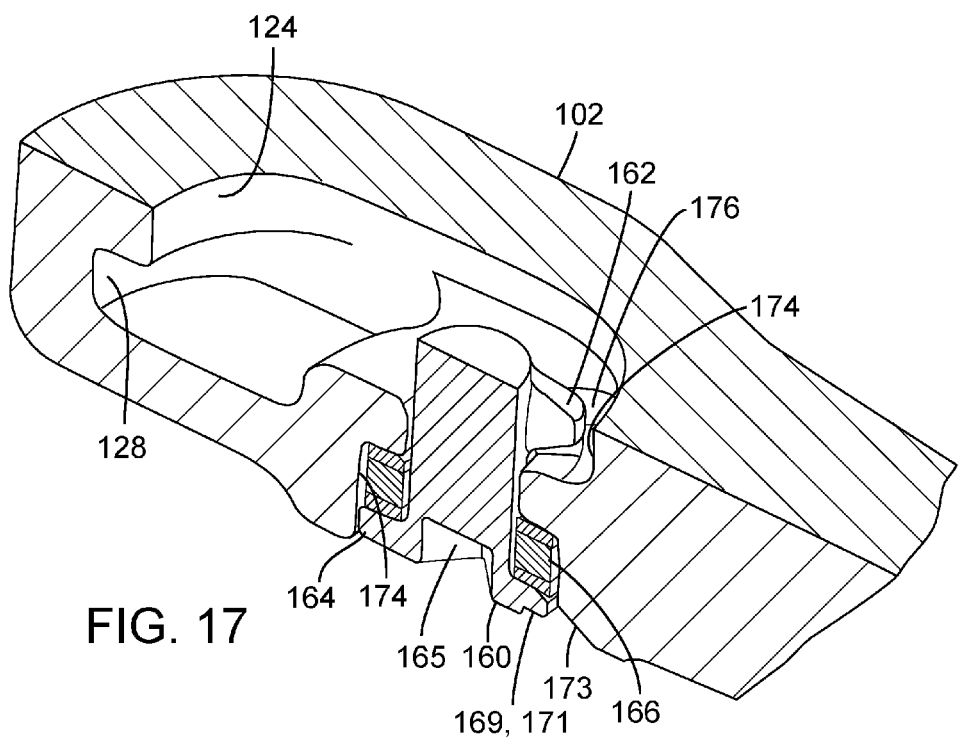

The helical groove 174 can be provided with a detent 176. The detent 176 can be positioned as desired, such as spaced by 90 degrees from the position of the keyhole 165. FIG. 17 shows the nib 162 after it has been rotated into the detent 176, which tends to secure the locking member 160 in place.

Figure 18:
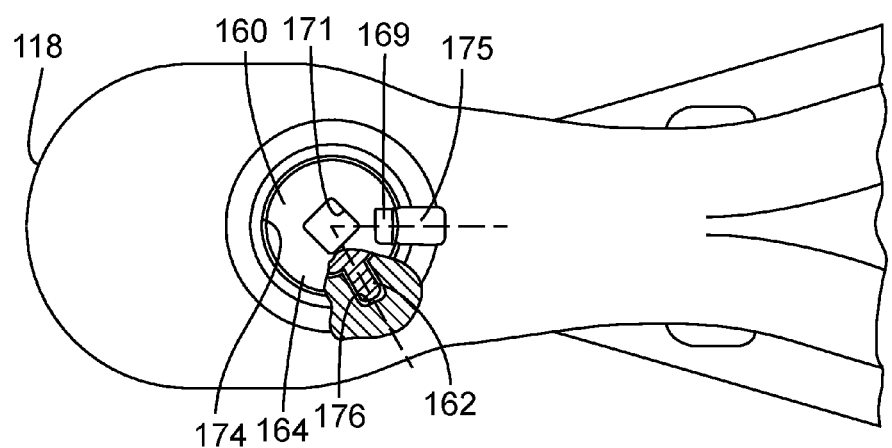
FIG. 18 is a plan view of a portion of the repair link showing the locking member in different positions.

Referring to FIG. 18, the head 164 of the locking member can have a recessed tool socket 171 for receiving a tool to rotate the locking member. The body can have a groove 175 or mark, and the head 164 can have a cut out 169 or other indicator selectively positioned so that when the cut out 169 is rotated into alignment with the groove 175 as shown, the operator can easily verify that the nub 162 is properly positioned in the detest 176.

In some implementations, the repair link 100 is configured for use with 4-inch chain links, but the size can be adjusted larger or smaller according to the desired application. In some implementations, the repair link 100 is fabricated by casting, such as of a high-strength cast alloy steel. In an exemplary implementation for 4-inch chain, a tensile strength of at last 150,000 psi is desirable. In some implementations, the finished casting is ready for use without requiring any machining.

The repair link 100 as illustrated has a double pitch configuration. Thus, a single repair link of this configuration can be used to replace one regular link of double pitch chain. Thus, only one repair link is required, whereas conventional repair approaches would require repair by (1) re-welding the damaged link (which, if possible, is time consuming, requires skilled tradespersons and can be difficult under field conditions) or (2) using conventional repair links (which have only a single pitch configuration) linked together (which requires more links and more assembly operations). A repair link for 4-inch chain may weigh 700 pounds or less, so the weight savings in using a single repair link configured as a double pitch link versus two conventional single pitch repair links is considerable.

As mentioned, the repair link 100 can be assembled without welding. In addition, the procedure for assembling and disassembling the repair link 100 does not require the use or a torch or other source of heat or a hammer Rather, only a conventional tool shaped to fit in the socket 165 (which can be square as shown or another suitable shape) and rotate the locking pin 160 is required. Therefore, the overall time required to substitute the repair link 100 for a damaged link is less than experienced using conventional approaches.

In view of the many possible embodiments to Which the disclosed principles may be applied, it should be recognized that the illustrated embodiments are only preferred examples and should not be taken as limiting in scope. Rather, the scope of protection is defined by the following claims. We therefore claim all that comes within the scope and spirit of these claims.

We claim:

1. A repair link for chain, comprising:
a body having a longitudinal axis;
a first loop section extending from the body, the first loop section defining a first loop opening with a first loop axis extending normal to the first loop opening;
a second loop section extending from the body opposite the first loop section, the second loop section defining a second loop opening with a second loop axis extending normal to the second loop opening;
wherein the first loop axis and the second loop axis are non-parallel, and wherein each of the first loop section and the second loop section has a removable loop segment that is removable to open the respective loop opening to couple the repair link to another link of chain, reassembleable with the respective loop section, and movable parallel to the longitudinal axis into a locked position to secure the removable loop segment and enclose the respective loop opening.

2. The repair link of claim 1, wherein the first loop section and the second loop section are rotated relative to each other such that the first loop axis and the second loop axis are rotated approximately 90 degrees relative to each other.

3. The repair link of claim 1, wherein the removable loop segment is removable from the respective loop section by sliding the removable loop segment in a direction generally parallel to the longitudinal axis and urging the removable loop segment in a transverse direction generally perpendicular to the longitudinal axis.

4. The repair link of claim 1, wherein the removable loop segment has a distal end and an opposite proximal end, and wherein the proximal end has a forked configuration defining two spaced apart interior hooks.

5. The repair link of claim 4, wherein the removable loop segment comprises a loop segment body having an exterior surface subject to wear during use, the exterior surface comprising wear indicator regions covering each of the interior hooks.

6. The repair link of claim 4, wherein the repair link comprises a pair of spaced apart recesses shaped to receive the forked configuration of the inner end of the removable loop segment.

7. The repair link of claim 4, wherein the distal end of the removable loop segment comprises an extension, and the body comprises a cavity shaped to receive the extension.

8. The repair link of claim 7, wherein the cavity is dimensioned larger than the extension in the longitudinal direction, and wherein the removable loop segment can be moved in the axial direction relative to the body with the extension translating within the cavity.

9. The repair link of claim 4, wherein the distal end of the removable loop segment comprises an extension and a lip protruding from the extension, and the body comprises a cavity shaped to receive the extension, the cavity further comprising a recess shaped to receive the lip.

10. The repair link of claim 7, wherein the cavity extends from an inner surface and the body comprises a through hole for a locking pin that extends from an opposite outer surface and is joined to the cavity.

11. The repair link of claim 10, further comprising a locking pin shaped to be received in the through hole and extend into the cavity to contact the extension of the removable loop segment and to resist axial movement thereof.

12. The repair link of claim 1, wherein the removable loop segments of the first and second loop sections are movable in a longitudinal direction independent of each other.

13. The repair link of claim 1, wherein the repair link has a double chain pitch configuration defined along the longitudinal axis.

14. The repair link of claim 1, wherein the repair link is configured to replace one link of a double chain pitch assembly.

15. The repair link of claim 1, wherein the body, the first loop section, the second loop section and the removable loop segment are assembled together for use without welding.

16. The repair link of claim 1, wherein the removable loop segment is configured for assembly with the body without machining or other mechanical shaping or finishing operation.

17. The repair link of claim 1, wherein the removable loop segment has a distal end and an opposite proximal end, and wherein the proximal end has at least one interior hook shaped to engage a corresponding hook receiving area of the body.

18. A repair ink for chain, comprising:
a body having a longitudinal axis:
a first loop section extending from the body, the first loop section defining a first loop opening with a first loop axis extending normal to the first loop opening;
a second loop section extending from the body opposite the first loop section, the second loop section defining a second loop opening with a second loop axis extending normal to the second loop opening;
wherein the first loop axis and the second loop axis are non-parallel, and wherein each of the first loop section and the second loop section has a removable loop segment and a lock member, and wherein the removable loop segment is removable to open the respective loop opening to couple the repair link to another link of chain, reassembleable with the respective loop section, and lockable in a locked position with the lock member to secure the removable loop segment relative to the respective loop section and to enclose the respective loop opening.

19. The repair link of claim 18, wherein the lock member comprises a shaft with a protruding nub at a distal end, and the respective loop section comprises a through hole shaped to receive the shaft and a groove shaped to receive the nub.

20. The repair link of claim 19, further comprising a compression washer with an opening shaped to receive the shaft, the compression washer being configured to provide a biasing force tending to retain the lock member to lock the respective loop section in the locked position.

21. The repair link of claim 19, wherein the groove comprises a detent positioned at a selected angle of rotation relative to an insertion direction and shaped to retain the nub.

* * * * *